(12) United States Patent
Fukazawa

(10) Patent No.: US 6,871,967 B2
(45) Date of Patent: Mar. 29, 2005

(54) SOLID TYPE EC ELEMENT AND PROCESS FOR PRODUCING THE SAME

(75) Inventor: Akihiko Fukazawa, Fujieda (JP)

(73) Assignee: Murakami Corporation, Shizuoka (JP)

( * ) Notice: Subject to any disclaimer, the term of this patent is extended or adjusted under 35 U.S.C. 154(b) by 0 days.

(21) Appl. No.: 10/697,758

(22) Filed: Oct. 30, 2003

(65) Prior Publication Data
US 2004/0095630 A1 May 20, 2004

(30) Foreign Application Priority Data
Nov. 18, 2002 (JP) ......................... 2002-333045

(51) Int. Cl.[7] .................. G02B 27/00; G02B 5/08; G02F 1/15; G02F 1/153
(52) U.S. Cl. ............... 359/601; 359/602; 359/603; 359/604; 359/265; 359/270; 359/272
(58) Field of Search ............... 359/265–275, 359/601, 602, 603, 604, 610, 611; 345/105, 107

(56) References Cited

U.S. PATENT DOCUMENTS

| 5,148,306 A | * | 9/1992 | Yamada et al. | 359/271 |
|---|---|---|---|---|
| 5,187,607 A | * | 2/1993 | Endo et al. | 359/266 |
| 5,640,274 A | | 6/1997 | Iwama et al. | |
| 2002/0149829 A1 | | 10/2002 | Mocizuka et al. | |

FOREIGN PATENT DOCUMENTS

| JP | 63-196342 | 8/1988 |
|---|---|---|
| JP | 6-38476 | 6/1994 |

* cited by examiner

Primary Examiner—Hung Xuan Dang
Assistant Examiner—Tuyen Tra
(74) Attorney, Agent, or Firm—Hedman & Costigan, P.C.

(57) ABSTRACT

A solid type EC element having a substrate; a lower electrode layer formed on the substrate; an EC layer formed on the lower electrode layer; and an upper electrode layer formed on the EC layer is disclosed in which coloring regions having a complicated shape can easily be applied, and a phenomenon of blurred color occurring around coloring regions can be prevented. The lower electrode layer is divided by one or more parting lines non-linearly formed along the outline of a desired coloring region so as to surround the coloring region into a portion for forming a coloring region including the coloring region and a portion for not forming a coloring region not including the coloring region in the state the portion for forming a coloring region and the portion for not forming a coloring region are not conducted to each other.

26 Claims, 10 Drawing Sheets

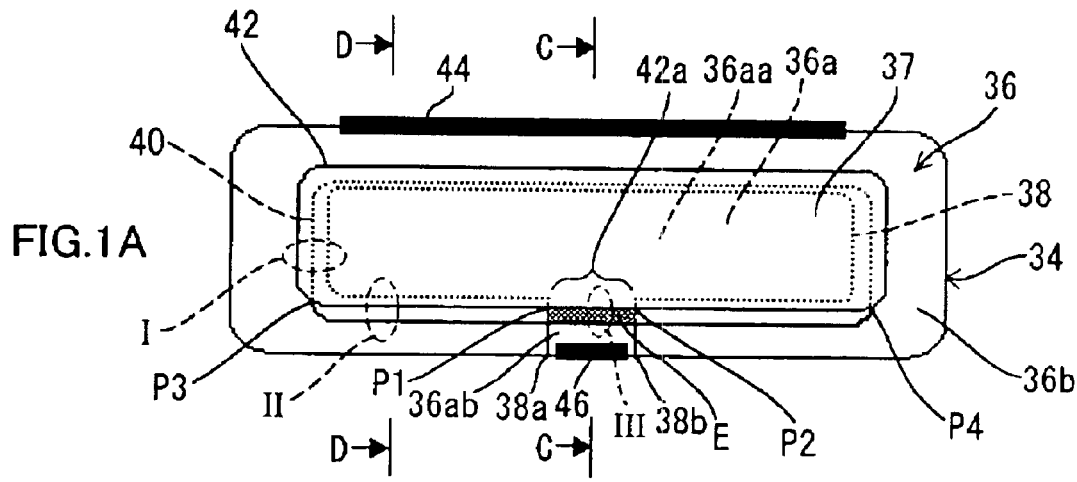
FIG.1A
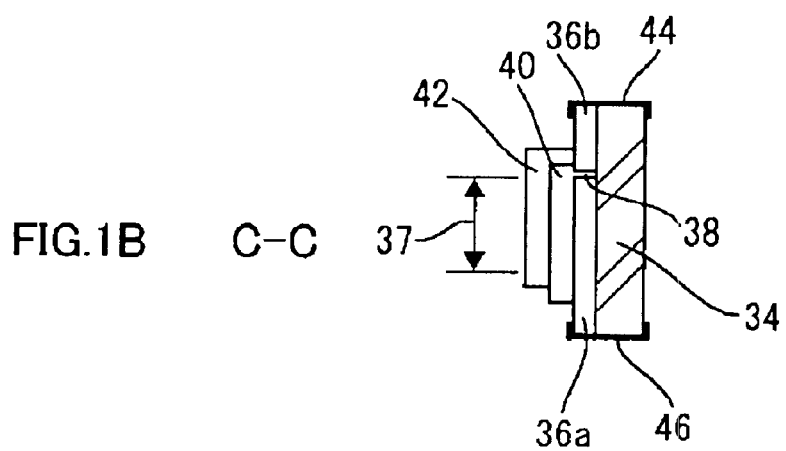
FIG.1B  C-C
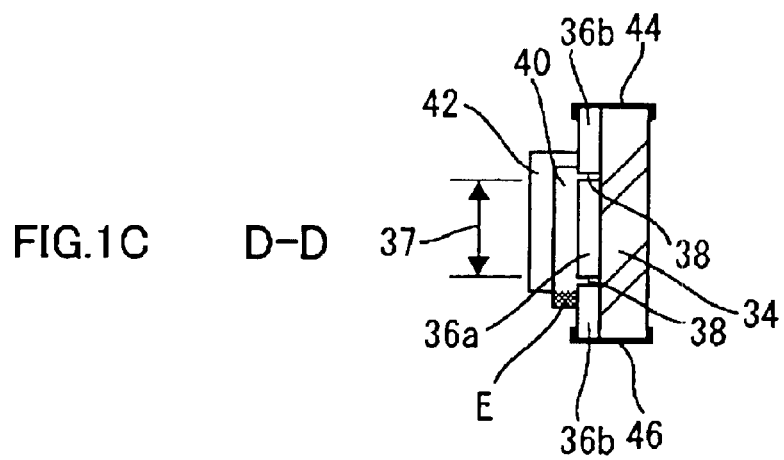
FIG.1C  D-D

PRIOR ART
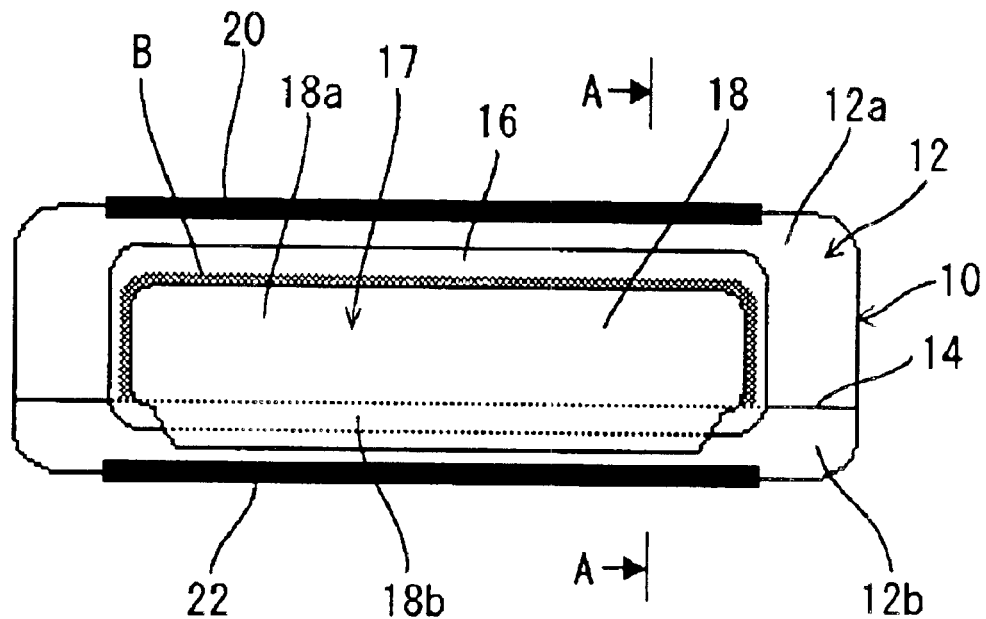
FIG.2A  Rear Surface
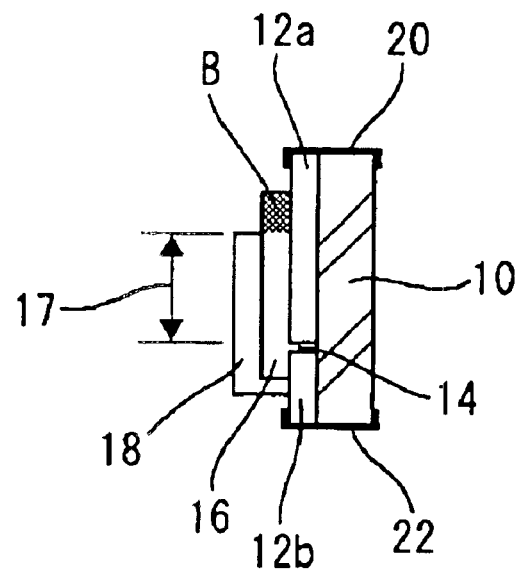
FIG.2B  A-A

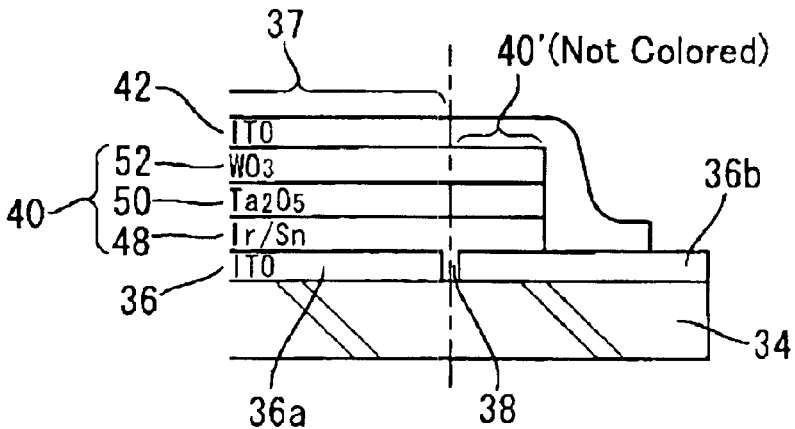
FIG.5A Part I
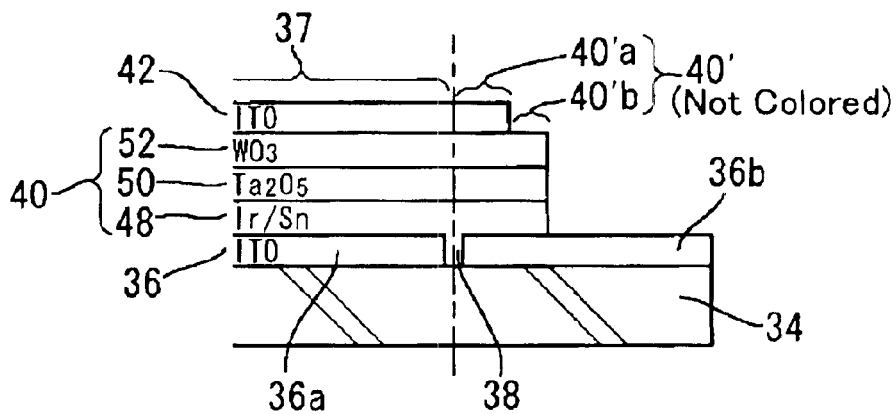
FIG.5B Part II
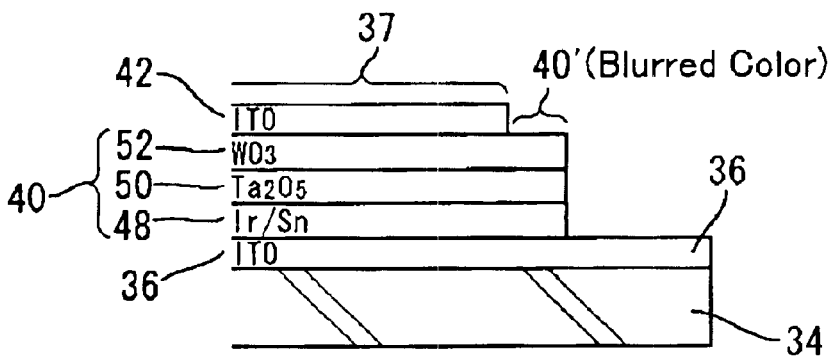
FIG.5C Part III

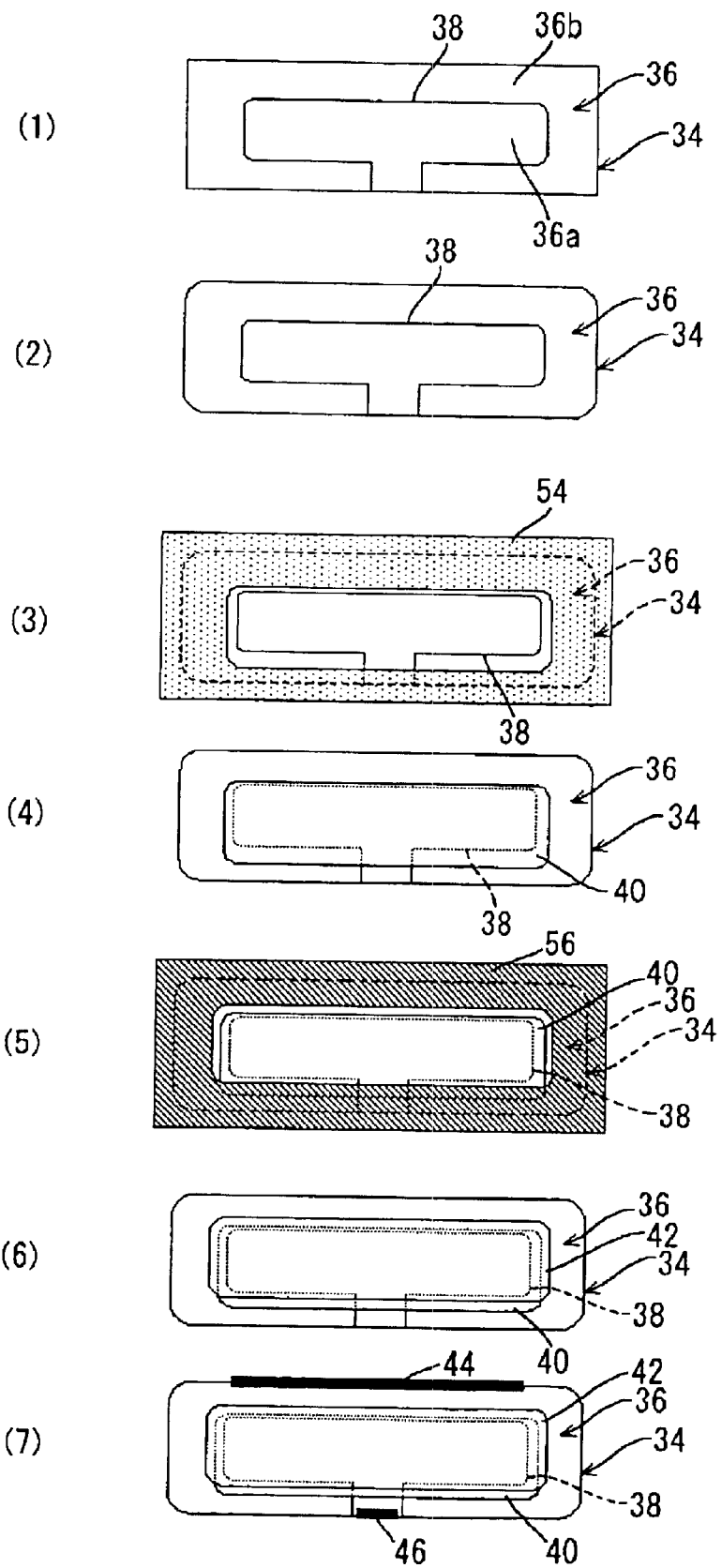

SOLID TYPE EC ELEMENT AND PROCESS FOR PRODUCING THE SAME

BACKGROUND ARTS

1. Field of the Invention

The present invention relates to a solid type EC (electrochromic) element and a process for producing the same. More particularly, the present invention relates to a solid type EC element in which coloring regions can easily be delimited, coloring regions having a complicated shape can easily be applied, and a phenomenon of blurred color occurring around coloring regions can be prevented.

2. Description of the Related Arts

An EC element is an element which varies a light transmittance by the application of a voltage, and has been utilized in automobile anti-glare mirrors, light modulating windows, display elements and the like. A solid type EC element is an element in which layers making up the EC element are composed of solid materials. FIG. 2 shows a configuration of an automobile EC mirror (inner mirror) having been conventionally put into a practical usage, which utilizes a solid type EC element. A substrate 10 is composed of a transparent glass, and has a lower electrode layer 12 composed of a transparent electrode film such as made of ITO formed on an entire surface of the rear surface thereof. Around a lower side of the lower electrode layer 12, a parting line 14 (groove) is horizontally formed along the lower side, whereby the lower electrode layer 12 is divided into upper and lower regions 12a and 12b, which are not conducted to each other, at the parting line 14 as a boundary.

An EC layer 16 is formed on the lower electrode layer 16 so as to extend over these two regions 12a and 12b of the lower electrode layer 12. The EC layer 16 is composed, for example, of an oxidative coloring layer made, e.g., of a mixture of iridium oxide with tin oxide, a solid electrolyte layer made, e.g., of $Ta_2O_5$, and a reductive coloring layer made, e.g., of $WO_3$ laminated in this order. An upper electrode layer 18 comprising a metal-made reflecting film such as made of Al or Cr is formed on the EC layer 16. In the upper electrode layer 18, a region 18b facing to the region 12b of the lower electrode layer 12 is formed so that a part of the region 18b extends outside of the EC layer, and the extending portion of the upper electrode layer 18 is conducted to the region 12a of the lower electrode layer 12. A region 18a of the upper electrode layer 18, facing to the region 12a of the lower electrode layer 12, is formed within the surface of the EC layer 16 as a whole, and is not conducted to the region 12a of the lower electrode layer 12. Clip electrodes 20 and 22 are attached to upper and lower side portions of the substrate 10 as electrode-tapping portions, respectively. The clip electrode 20 is conducted to the region 12a of the lower electrode layer 12, and the clip electrode 22 is conducted to the upper electrode layer 18 via the region 12b of the lower electrode layer 12.

According the configuration described above, when a voltage in a coloring direction is applied between the clip electrodes 20 and 22, the EC layer 16 is colored. In this case, amongst the entire region of the EC layer 16, the region surrounded by the outer edge of the upper electrode layer 18 and the parting line 14 is colored. Subsequently, when a voltage in a reverse direction (voltage in a discoloration direction) is applied between the clip electrodes 20 and 22 or when the clip electrodes 20 and 22 are connected to make a short circuit, the EC layer 16 is discolored.

Referring to FIG. 3, production stages of the conventional automobile EC mirror will be described.

(1) A glass substrate 10 having an ITO film 12 formed on the entire surface thereof as the lower electrode layer is prepared, and a parting line 14 is linearly formed around a lower side of the ITO film 12 parallel to the lower side thereof by etching through a laser beam to divide the ITO film 12 into two regions 12a and 12b.

(2) The outer edge of the substrate 10 is cut into a mirror form.

(3) A masking member 24 for forming an EC layer is aligned and put on a predetermined position of the substrate 10, and the substrate 10 having being covered with the masking member 24 is accommodated within a vapor deposition apparatus. A material for an oxidative coloring layer, a material for a solid electrolyte layer, and a material for a reductive coloring layer, making up the EC layer, are deposited one after another to form the EC layer 16.

(4) The substrate 10 is taken out from the vapor deposition apparatus, and the masking member 24 for forming an EC layer is removed.

(5) A masking member 26 for forming an upper electrode layer is aligned to and put on a predetermined position of the substrate 10, and the substrate 10 having being covered with the masking member 26 is accommodated within a vapor deposition apparatus. A metal material making up the upper electrode layer is deposited to form the upper electrode layer 10.

(6) The substrate 10 is taken out from the vapor deposition apparatus, and the masking member 26 for forming an upper electrode layer is removed.

(7) The clip electrodes 20 and 22 are attached to upper and lower side portions of the substrate 10. A sealing glass is adhered on the substrate 10 with an adhesive to seal the laminated film to complete the product.

According to the conventional automobile EC mirror, since the coloring region (the region to be colored) 17 is mainly determined by the shape of the upper electrode layer 18, even in the case of products each having a slightly different shape, the masking members 26 for forming an upper electrode layer are required to be separately prepared at the time of forming the upper electrode layer 18 (Stage (5) in FIG. 3). Also, if the shape of the coloring region 17 is complicated, a masking member 26 for forming an upper electrode layer, which corresponds to the complicated shape, should be required.

The conventional automobile EC mirror described above is disadvantageous in the fact that when it is driven in a discoloration direction, blurred color (the situation where the coloring remains blurring) occurs around a portion making up the outer edge of the upper electrode layer 18 amongst the outline of the coloring region 17 (a portion B shown by hatching in FIG. 2). Referring to FIG. 4, the phenomenon of blurred color will be described. FIG. 4A shows a cross sectional view of a portion where the outline of the coloring region 17 is composed of the outer edge of the upper electrode layer 18. In this figure, it is assumed that EC layer 16 is composed of, from the lower layer to the upper layer, a mixed layer 28 of iridium oxide and tin oxide as the oxidative coloring layer, a $Ta_2O_5$ layer 30 as the solid electrolyte layer, and a $WO_3$ layer 32 as the reductive coloring layer laminated in this order. In such a configuration, when a voltage is applied taking the upper side as a minus pole and the lower side as a plus pole as shown in FIG. 4B, due to the moisture contained in the $Ta_2O_5$ layer 30, $H^+$ ions are captured within the $WO_3$ layer 32 to color the $WO_3$ layer 32 blue. At the same time, $OH^-$ ions are captured within the mixed layer 28 of iridium oxide and tin oxide, and the mixed layer 28 of iridium oxide and tin oxide is also colored blue. Subsequently, when a voltage is applied taking the upper side as a plus pole and the lower side as a minus pole as shown in FIG. 4C or when both the upper pole and the lower pole are connected to make a short circuit, $H^+$ ions having been captured within the $WO_3$ layer 32 and $OH^-$ ions having been captured within the mixed layer 28 of iridium oxide and tin oxide are returned to the $Ta_2O_5$ layer 30, respectively to discolor the $WO_3$ layer 32 and the mixed layer 28 of iridium oxide and tin oxide. However, in such a configuration that the EC layer 16 and the lower electrode layer 12 project outside of the outer edge of the upper electrode layer 18 as shown in FIG. 4A, $H^+$ ions are diffused into a region 32' (region in which positive and negative electrodes are not facing to each other) projecting outside of the $WO_3$ layer 32, and $OH^-$ ions are diffused into a region 28' (region in which positive and negative electrodes are not facing to each other) projecting outside of the mixed layer 28 of iridium oxide and tin oxide at the time of the coloration as shown in FIG. 4D. Consequently, although the outwardly projecting region 32' and the outwardly projecting region 28' are colored, $H^+$ ions and $OH^-$ ions cannot be completely returned to the $Ta_2O_5$ layer 30 from the outwardly projecting region 32' and the outwardly projecting region 28', even when the reverse voltage is applied in order to make a discoloration. As a result, blurred color occurs in these regions 32' and 28' [around a portion making up the outer edge of the upper electrode layer 18 amongst the outline of the coloring region 17 (a portion B shown by hatching in FIG. 2)].

The present invention has been made in light of the above situation and is to provide a solid type EC element in which coloring regions having a complicated shape can easily be applied, and a phenomenon of blurred color occurring around coloring regions can be prevented and to provide a process for producing the same.

SUMMARY OF THE INVENTION

A solid type EC element according to the present invention has a substrate, a lower electrode layer formed on said substrate, an EC layer formed on said lower electrode layer, and an upper electrode layer formed on said EC layer, wherein said lower electrode layer is divided by one or more parting lines non-linearly formed along the outline of a desired coloring region (region to be colored) so as to surround said coloring region into a portion for forming a coloring region including said coloring region and a portion for not forming a coloring region not including said coloring region in the state said portion for forming a coloring region and said portion for not forming a coloring region are not conducted to each other; wherein layers, which make up said EC layer, and said upper electrode layer are formed so as to entirely cover said coloring area; and wherein said upper electrode layer is not conducted to said portion for forming a coloring region of said lower electrode layer, and said upper electrode layer is conducted to said portion for not forming a coloring region of said lower electrode layer.

A solid type EC element according to another aspect of the present invention also has a substrate; a lower electrode layer formed on said substrate; an EC layer formed on said lower electrode layer; and an upper electrode layer formed on said EC layer; wherein said lower electrode layer is divided by one or more parting lines, which are non-linearly formed along the outline of a desired coloring region so as to surround said coloring region, and are formed so that both ends of the lines are deviated from the outline of said coloring region and extend to mutually different positions on the outer edge of said lower electrode layer, into a portion for forming a coloring region including said coloring region and a portion for not forming a coloring region not including said coloring region in the state said portion for forming a coloring region and said portion for not forming a coloring region are not conducted to each other; wherein layers, which make up said EC layer, and said upper electrode layer are formed so as to entirely cover said coloring area; wherein the outer edge of said EC layer is entirely formed outside of said coloring region; wherein the outer edge of said upper electrode layer at a section which faces to said portion for not forming a coloring region of said lower electrode layer is totally formed outside of said coloring region, and at least part thereof outwardly projects from said outer edge of the EC layer, and said upper electrode layer is conducted to said portion for not forming a coloring region of said lower electrode layer at the portion outwardly projecting from said outer edge of the EC layer; wherein the outer edge of said upper electrode layer at a section which faces to said portion for forming a coloring region of said lower electrode layer is totally formed at a portion inside of the edge of said EC layer along with the outline of said coloring region; wherein the outer edge of said upper electrode layer over an appropriate section before and after the position crossing to said parting lines is formed at a portion inside of the outer edge of said EC layer, whereby said upper electrode layer is not conducted to said portion for forming a coloring region of said lower electrode layer; and wherein the outline of said coloring region is delimited by the outline of a region where all of said portion for forming a coloring region of said lower electrode layer, said layers which make up said EC layer, and said upper electrode layer are overlapped with each other.

According to the solid type EC element of the present invention, since one or more parting lines is/are non-linearly formed along the outline of a desired coloring region so as to surround said coloring region, the coloring region can easily be delimited by the parting line(s) and a coloring region of a complicated shape can easily be applied. Also, as described later on, section which would occur blurred color can be decreased.

The solid type EC element according to the present invention can be configured in a various ways as follows: Layers making up the EC layer (such as coloring layers and an electrolyte layer) each having the same shape are formed and laminated on the same position. A plate material other than the substrate is adhered on the substrate with an adhesive, and the lower electrode layer, the EC layer, and the upper electrode layer are inserted between the substrate and the plate material other than the substrate. The parting line or lines makes or make up a main portion of the coloring region, the outer edge of the upper electrode layer makes up the remaining portion of the main portion of the coloring region. The portion for forming a coloring region of the lower electrode layer has a shape which characterizes the outer shape of the coloring region. The portion for forming a coloring region of the lower electrode layer has a first region making up the coloring region and a second region, which is continuous with the first region to the outer edge of the lower electrode layer without making up the coloring region, demarcated by the outer edge position of the upper electrode layer. The EC layer is formed in the state where the EC layer covers a portion from the whole of the first region of the portion for forming a coloring region of the lower electrode layer to a part of the second region thereof, and the upper electrode layer covers the whole of the first region of the portion for forming a coloring region of the lower electrode layer and does not covers the second region thereof. The substrate is composed of a transparent substrate, the lower electrode layer is composed of a transparent electrode film, the upper electrode layer is composed of a metal-made reflecting film, the substrate is adhered to a plate material other than the substrate with an adhesive, and the lower electrode layer, the EC layer, and the upper electrode layer are intervened between the substrate and the plate other than the substrate to make up an EC mirror. An automobile EC mirror is composed by which the substrate is formed into an automobile mirror, and the first region of the portion for forming a coloring region of the lower electrode layer, which follows the outward appearance of the substrate, is also formed into the automobile mirror. A plate other than the substrate is adhered to the substrate with an adhesive, the lower electrode layer, the EC layer, and the upper electrode layer are intervened between the substrate and the plate other than the substrate, wherein the substrate is composed of a transparent substrate, both of the lower electrode layer and the upper electrode layer are composed of transparent electrodes films, the adhesive is composed of a transparent adhesive, and the plate other than the substrate is composed of a transparent plate to make up a transmitting EC element. A front cover plate equipped with a function for adjusting luminance of an automobile meter is composed wherein the outward appearance of the substrate is formed into a circular shape, the both of the lower electrode layer and the upper electrode layer are composed of transparent electrode films, and the first region of the portion for forming a coloring region of the lower electrode layer, which follows the outward appearance of the substrate, is also formed into a circular shape. An exposure-regulator placed on an optical axis of an image pickup device of a digital camera is composed wherein the substrate is composed of a transparent substrate, the both of the lower electrode layer and the upper electrode layer are composed of transparent electrode films, and the first region of the portion for forming a coloring region of the lower electrode layer is formed into a circular shape. A display element is composed wherein the substrate is composed of a transparent substrate, the lower electrode layer is composed of a transparent electrode film, the upper electrode layer is composed of a transparent electrode film or a metal-made reflecting film, and the coloring region is formed into a desired shape selected from among letters, symbols and figures. A display element is composed wherein the first region of the portion for forming a coloring region of the lower electrode layer is formed into a desired shape selected from among letters, symbols and figures. In a preferred embodiment, the parting line makes up half or more the total length of the outline of the coloring region. Also, the portion for forming a coloring region of the lower electrode layer has a portion narrower than the maximum width of the coloring region, and a portion which is made up of the outer edge of the upper electrode layer amongst the outline of the coloring region is formed on the portion for forming a coloring region where the width is narrower. A length of a portion constituted by the outer edge of the upper electrode layer amongst the outline of the coloring region is composed so as to be shorter than the maximum outer size of the coloring region. The parting line is formed inside of the outer edge of the substrate along the length longer than the total length of the outer edge of the substrate. The lower electrode layer is formed over the entire surface of the substrate, and both ends of the parting line are formed extending to the outer edge of the upper electrode layer at mutually different positions, the whole of the outer edges of the EC layer and the upper electrode layer are formed inside of the outer edge of the substrate along the outer edge of the substrate, and at the position facing to the portion for not forming coloring region, the outer edges of the EC layer and the upper electrode layer are passed between the outer edge of the substrate and the parting line. The outer edge of the upper electrode layer is formed so as to be positioned inside of the outer edge of the EC layer at the position facing to the portion for forming a coloring region of the lower electrode layer, half or more length of the outer edge of the upper electrode layer is positioned outside of the outer edge of the EC layer at the position facing to the portion for not forming a coloring region, and the outer edge of the upper electrode layer is crossing to the outer edge of the EC layer at the position facing to the portion not forming a coloring region so as to alter the external and internal positional relation with the outer edge of the EC layer. The position where the outer edge of the upper electrode layer is crossing to the outer edge of the EC layer to alter the external and internal positional relation with the outer edge of the EC layer is the position facing to the portion for not forming a coloring region and the position just before crossing the boundary portion between the portion for not forming a coloring region and the portion for forming a coloring region. The parting line is composed of a groove where the lower electrode layer is caved into a fine line having a constant width by an etching treatment with a laser beam scanning. The width of the parting line is formed to be not more than 0.1 mm. The portion for forming a coloring region and the portion for not forming a coloring region of the lower electrode layer are formed extending to the outer edge of the substrate respectively, an electrode-tapping portion of the portion for forming a coloring region is composed of a clip electrode attached to the outer edge of the substrate facing to the portion for forming a coloring region, and an electrode-tapping portion of the portion for not forming a coloring region is composed of a clip electrode attached to the outer edge of the substrate facing to the portion for not forming a coloring region. The lower electrode layer is formed over the entire surface of the substrate and the EC layer and the upper electrode layer are formed on regions inside of the outer edge of the substrate, respectively.

A process for producing a solid type EC element according to the present invention comprises: a film formation stage where a lower electrode layer are formed on a substrate; a stage where an etching treatment with a laser beam scanning is subjected to a surface of said lower electrode layer to form a parting line so as to surround a desirable coloring region along the outline of the coloring region, whereby the lower electrode layer is divided into a portion forming a coloring region including the coloring region and a portion for not forming a coloring region not including the coloring region in such a manner that they are not conducted to each other; a stage where layers for making up an EC layer are formed on the lower electrode layer in such a manner that they covers the entire surface of the coloring layer; and a stage where an upper electrode layer is formed on the EC layer in such a manner that said upper layer covers the whole of the coloring region, and is not conducted to the portion for forming a coloring region of the lower electrode layer and is conducted to the portion for not forming a coloring region of the lower electrode layer.

A process for producing a solid type EC element according to another aspect of the present invention comprises a film formation stage where a lower electrode layer are formed on a substrate; a stage where an etching treatment with a laser beam scanning is subjected to a surface of the lower electrode layer to form a parting line so as to surround a desirable coloring region along the outline of the coloring region, in a non-linear manner and so that both ends are deviated from the outline of the coloring region and extend to the outer edge of the lower electrode layer at mutually different positions, whereby the lower electrode layer is divided by said parting line into a portion forming a coloring region including the coloring region and a portion for not forming a coloring region not including the coloring region in such a manner they are not conducted to each other; a stage where a coloring layer and a solid electrolyte layer are formed on the lower electrode layer having said parting line formed thereon using a common mask in such a manner that they covers the entire surface of the coloring region; and a stage where an upper electrode layer is formed on said EC layer utilizing a mask in such a manner that said upper electrode layer totally covers said coloring region; that the outer edge of said upper electrode layer at a section which faces to said portion for not forming a coloring region of said lower electrode layer is totally formed outside of said coloring region, and a part of said outer edge of said upper electrode layer projecting outside of said outer edge of the EC layer, and said upper electrode layer is conducted to said portion for not forming a coloring region of said lower electrode layer at the portion projecting outside of said outer edge of the EC layer; and that the outer edge of said upper electrode layer at a section which faces to said portion for forming a coloring region of said lower electrode layer is totally formed inside of the edge of said EC layer along with the outline of said coloring region, whereby said upper electrode layer is not conducted to said portion for forming a coloring region of said lower electrode layer.

The process for producing a solid type EC element according to the present invention may be carried out by forming a plurality of EC elements on one substrate in respective stages, and cutting the substrate into each EC element after the completion of respective staged. In this case, by cutting the substrate into each EC element, the portion for forming a coloring region and the portion for not forming a coloring region in each EC element can be non-conducted to each other.

BRIEF DESCRIPTION OF THE DRAWINGS

FIG. 1 is a back view and a cross-sectional view showing an embodiment of an automobile EC mirror according to the present invention.

FIG. 2 is a back view and a cross-sectional view showing a conventional automobile EC mirror.

FIG. 5 is a drawing showing a cross-sectional configurations of Part I, Part II, and Part III of FIG. 1.

FIG. 6 is a drawing showing production stages of EC mirror of FIG. 1.

DESCRIPTION OF PREFERRED EMBODIMENTS

Figure 3:
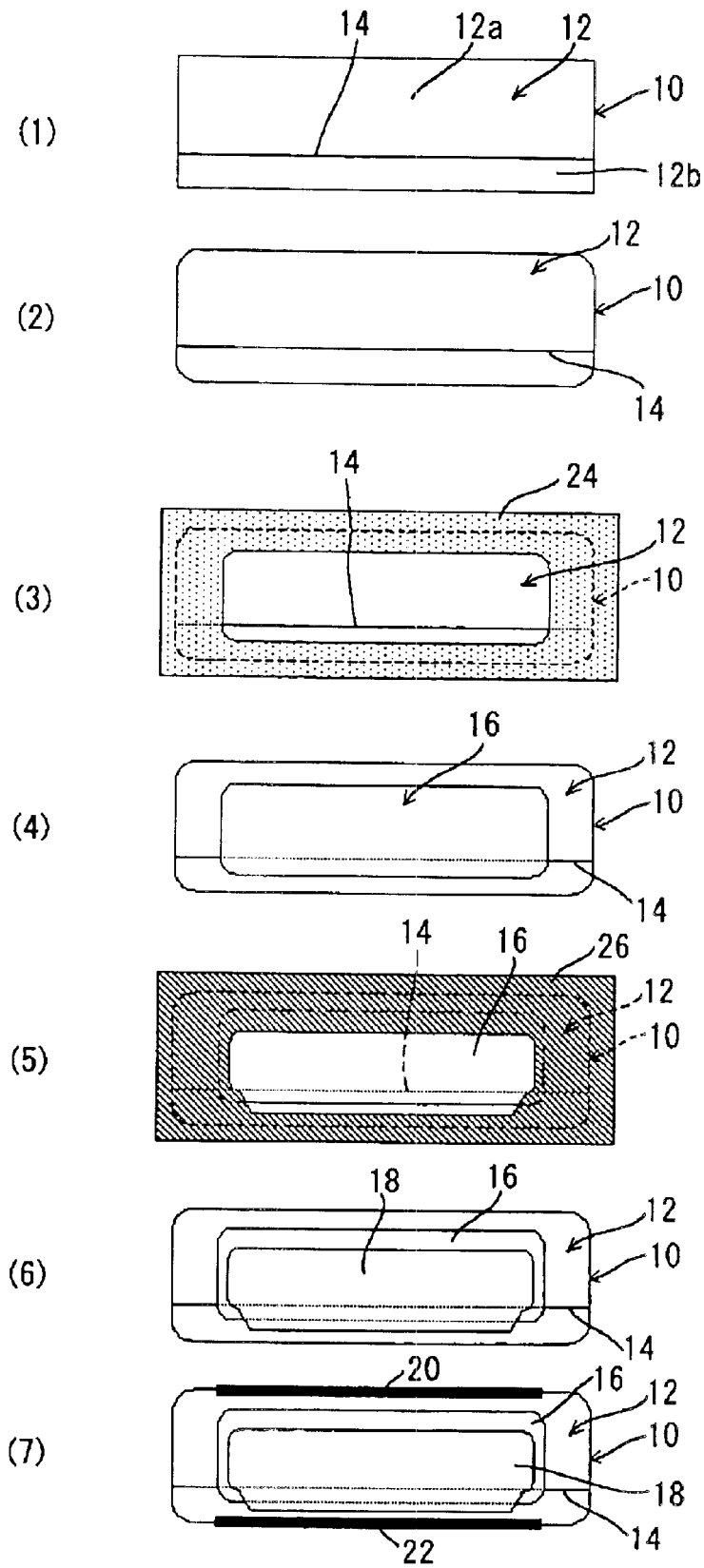
FIG. 3 is a drawing showing production stages of EC mirror of FIG. 2.
Figure 4A:
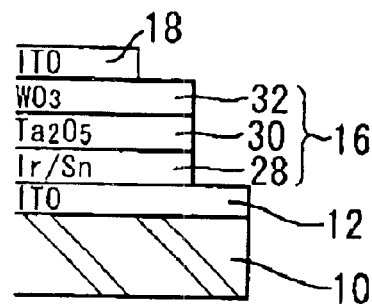
FIG. 4 is a drawing showing a phenomenon of blurred color occurring in the automobile EC mirror of FIG. 2.
Figure 4B:
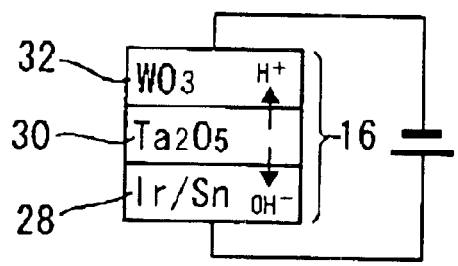
Figure 4C:
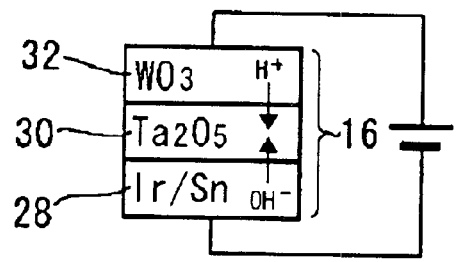
Figure 4D:
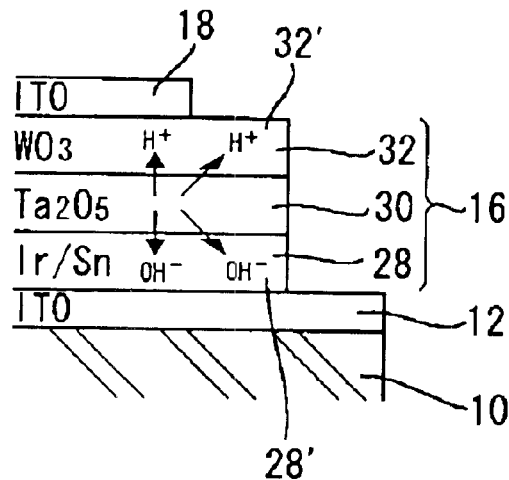

Embodiments of the present invention will now be described.

First Embodiment

FIG. 1 shows an embodiment of an automobile EC mirror according to the present invention. A substrate 34 is composed of a transparent glass whose outward appearance is formed into a mirror shape, and a lower electrode layer 36 composed of a transparent electrode film such as ITO is formed on the entire surface of one surface of the substrate 34 (rear surface viewing from the side of an incident surface of ambient light). On the lower electrode layer 36, a parting line 38 is formed into a rectangular shape so as to inwardly surround a desirable coloring region 37 along a main portion on the outline of the coloring region 37. The parting line 38 is composed of a caved groove in a finely line having a constant width (for example not more than 0.1 mm) by an etching treatment of the surface of the lower electrode layer 37 with laser beam scanning. Both ends 38a, 38b of the parting line 38 are deviated from the outline of coloring region 37 and extend to mutually different positions of the outer edge of the substrate 34. By such a configuration, the lower electrode layer 36 is divided into two outer and inner regions 36a, 36b, which are not conducted to each other, at the parting line 38 as a boundary. The inner region 36a makes up a portion for forming a coloring region including the coloring region 37 and possesses a shape characterizing an outward appearance of the coloring region. The outer region 36b makes up a portion for not forming a coloring region not including the coloring region 37.

An EC layer 40 is formed on the lower electrode layer 36. The EC layer 40 is composed, for example, of an oxidative coloring layer made of a mixture of iridium oxide with tin oxide or such, a solid electrolyte layer made of $Ta_2O_5$ or such, and a reductive coloring layer made of $WO_3$ or such laminated in this order, wherein these layers have the same shape and are laminated in the same position. The layers making up the EC layer 40 are formed so as to cover the whole of the coloring region 37. The outer edge of the EC layer 40 is positioned at the inside of the outer edge of the substrate 34, and is formed into a shape of a mirror along the outer edge of the substrate 34. The whole of the outer edge of the EC layer 40 is formed at the position outside of the coloring region 37.

An upper electrode layer 42 composed of a reflecting film made of a metal such as Al or Cr is formed on the EC layer 40. The upper electrode layer 42 is formed so as to cover the whole of the coloring region 37. The whole of the outer edge of the upper electrode layer 42 is positioned at the inside of the outer edge of the substrate 34 and the outer edge of the upper electrode layer 42 is formed into a mirror shape along the outer edge of the substrate 34. At a section facing to the portion 36b for not forming a coloring region of the lower electrode layer 36, the outer edge of the upper electrode layer 42 is totally positioned at the outside of the coloring region 37, and outwardly projects from the outer edge of the EC layer 40. By such a configuration, at the portion outwardly projecting from the outer edge of the EC layer 42, the upper electrode layer 42 is conducted to the portion 36b for not forming a coloring region of the lower electrode layer 36. The outer edge of the upper electrode layer 42 at a section 42a facing to the portion 36a for forming a coloring region of the lower electrode layer 36 is totally formed at the inside of the outer edge of the EC layer 40 along with the outline of the coloring region 37. The outer edge of the upper electrode layer 42 over an appropriate section before and after the positions P1 and P2 crossing to the parting line 38 is formed at the inside of the outer edge of the EC layer 40 (specifically on the EC layer 40). By such a configuration, the upper electrode layer 42 is not conducted to the portion 36a for forming a coloring region of the lower electrode layer 36.

As described above, the whole of the outer edges of the EC layer 40 and the upper electrode layer 42 are formed into a mirror shape at inside of the outer edge of the substrate 34 along the outer edge of the substrate 34, and at the position facing to the portion 36b for not forming a coloring region, they are passed between the outer edge of the substrate 34 and the parting line 38. The outer edge of the upper electrode layer 42 is also positioned at the inside of the outer edge of the EC layer 40 at the position facing to the portion 36a for forming a coloring region of the lower electrode layer 36. At the position facing to the portion 36b for not forming a coloring region of the lower electrode layer 36, a major portion (length of half or more) of the outer edge of the upper electrode layer 42 is positioned at the outside of the outer edge of the EC layer 40 so as to be crossing to the outer edge of the EC layer 40 at positions P3 and P4 within the region facing to the portion 36b for not forming a coloring region, whereby the external and internal positional relation with the outer edge of the EC layer 40 is altered. The outline of the coloring region 37 is delimited by the outline of the region where all of the portion 36a for forming a coloring region of the lower electrode layer 36, the EC layer 40 and the upper electrode layer 42 are overlapped with each other. Specifically, the parting line 38 makes up a main portion of the outline of the coloring region 37, and the outer edge of the upper electrode layer 42 makes up the remaining portion of the coloring region 37 (section 42a of the outer edge of the upper electrode layer 42). Furthermore, the portion 36a for forming a coloring region of the lower electrode layer 36 is divided into a region 36aa (first region) formed into a mirror shape, which follows the outward appearance of the substrate 34 to make up the coloring region 37 and a region 36ab (second region) extending to the outer edge of the substrate 34 continuous to the region 36aa without making up the coloring region 37 demarcated by the position 42a of the outer edge of the upper electrode layer 42. The width of the boundary portion between these regions 36aa and 36ab is composed to be shorter than the maximum width of the coloring region 37 (maximum external size of the coloring region 37).

Clip electrodes 44 and 46 are attached to upper and lower sides of the substrate 34 as electrode-tapping portions. The clip electrode 44 is conducted to the upper electrode layer 42 via the portion 36b for not forming a coloring region of the lower electrode layer 36. The clip electrode 46 is conducted to the portion 36a for forming a coloring region of the lower electrode layer 36. A sealing glass (not shown) is adhered onto the substrate 34 with an adhesive to seal the laminated films. Upon applying a voltage in a coloring direction between the clip electrodes 44 and 46, the coloring region 37 of the EC layer 40 is colored. Subsequently, upon applying a voltage in a reverse direction (voltage in a discoloring direction) between the clip electrodes 44 and 46, or upon shortening between the clip electrodes 44 and 46, the EC layer 40 is discolored. The portion where the blurred color occurs at the time of the discoloration is around the portion 42a made up of the outer edge of the upper electrode layer 42 amongst the outline of the coloring region 37 (portion E shown by hatching line in FIG. 1). Since the length of this portion in this embodiment is short, the section where blurred color occurs can be shortened in comparison with the conventional configuration shown in FIG. 2. Also, since the parting line 38 makes up the major portion of the total length of the outline of the coloring region 37 (length not less than half), the main portion of the outline of the coloring region 38 can be made up of the parting line 37 to characterize the outward appearance of the coloring region 37.

The reason why the portion where blurred color occurs is only around the portion 42a composed of the outer edge of the upper electrode layer 42 amongst the outline of the coloring region 37 will be described. FIG. 5 is a drawing showing a cross-sectional configurations of Part I, Part II, and Part III of FIG. 1. It is assumed that the EC layer 40 is composed of, from the lower layer to the upper layer, a mixed layer 48 of iridium oxide and tin oxide as the oxidative coloring layer, a $Ta_2O_5$ layer 50 as the solid electrolyte layer, and a $WO_3$ layer 52 as the reductive coloring layer laminated in this order. In such configuration, when a voltage is applied taking the upper side as a minus pole and the lower side as a plus pole, due to the moisture contained in the $Ta_2O_5$ layer 50, $H^+$ ions are captured within the $WO_3$ layer 52 to color the $WO_3$ layer 52 blue. At the same time, $OH^-$ ions are captured within the mixed layer 48 of iridium oxide and tin oxide, and the mixed layer 48 of iridium oxide and tin oxide is also colored blue. At this time, at Part I shown in FIG. 5A, a region 40' extending to the outside of the parting line 38 of the EC layer 40, upside and downside thereof, which are sandwiched between the electrode layers 42 and 36b having the same electric potential, are not colored since $H^+$ ions and $OH^-$ ions are not diffused thereinto. Consequently, when a discoloring voltage is applied taking the upper side as a plus pole and the lower side as a minus pole or when both the upper pole and the lower pole are connected to make a short circuit, there does not occur blurred color at the region 40'. Similarly, in Part II shown in FIG. 5B, an inward portion 40'a amongst the region 40' extending to the outside of the parting line 38 of the EC layer 40, upside and downside thereof, which are sandwiched between the electrode layers 42 and 36b having the same electric potential, are not colored, since $H^+$ ions and $OH^-$ ions are not diffused thereinto. At an outward portion 40'b amongst the region 40', there does not exist the upper electrode layer 42, but since $H^+$ ions and $OH^-$ ions are not diffused into the inward portion 40'a, $H^+$ ions and $OH^-$ ions are also not diffused into the outward portion 40'b, and, therefore, the portion 40'b is not discolored. Consequently, when a discoloring voltage is applied taking the upper side as a plus pole and the lower side as a minus pole or when both the upper pole and the lower pole are connected to make a short circuit, there does not occur blurred color at the region 40'. In contrast, at Portion III shown in FIG. 5C, since there is no upper electrode layer at the region 40' outwardly extending to the parting line 38 of the EC layer 40, $H^+$ ions diffused into the region 40' outwardly extending to the $WO_3$ layer 52, and $OH^-$ ions are diffused into the region 40' outwardly extending to the mixed layer 48 of iridium oxide and tin oxide; thus, the outwardly extending region 40' is colored. In such a state, even if a reverse voltage is applied for discoloration, $H^+$ ions and $OH^-$ ions cannot be returned from the outwardly extending region 40' to the $Ta_2O_5$ layer 50 in a complete manner. As a result, blurred color occurs around the region 40' (Portion E shown by hatching in FIG. 1). However, since the length of the portion 42a composed of the outer edge of the upper electrode layer 42 amongst the outline of the coloring region 37 is short, the section where blurred color occurs can be shortened.

One example of a process for producing the automobile EC mirror of FIG. 1 is described referring to FIG. 6.

(1) A glass substrate 34 having an ITO film 36 formed on the entire surface thereof as the lower electrode layer is prepared, and a parting line 14 is formed on the ITO film 36 into a mirror shape by an etching treatment of ITO film 36 with a laser beam to divide the ITO film 36 into two regions 36a and 36b.

(2) The outer edge of the substrate 34 is cut into a mirror form.

(3) A masking member 54 for forming an EC layer is aligned to and put on a predetermined position of the substrate 34, and is accommodated within a vapor deposition apparatus. A material for an oxidative coloring layer, a material for a solid electrolyte layer, and a material for a reductive coloring layer, making up the EC layer, are deposited one after another to form the EC layer 40.

(4) The substrate 34 is taken out from the vapor deposition apparatus, and the masking member 54 for forming an EC layer is removed.

(5) A masking member 56 for forming an upper electrode layer is aligned to and put on a predetermined position of the substrate 34, and is accommodated within a vapor deposition apparatus. A metal material making up the upper electrode layer is deposited to form the upper electrode layer 42.

(6) The substrate 34 is taken out from the vapor deposition apparatus, and the masking member 56 for forming an upper electrode layer is removed.

(7) The clip electrodes 44 and 46 are attached to both upper and lower side portions of the substrate 34. A sealing glass is adhered on the substrate 34 with an adhesive to seal the laminated films to complete the product.

Second Embodiment

Figure 7:
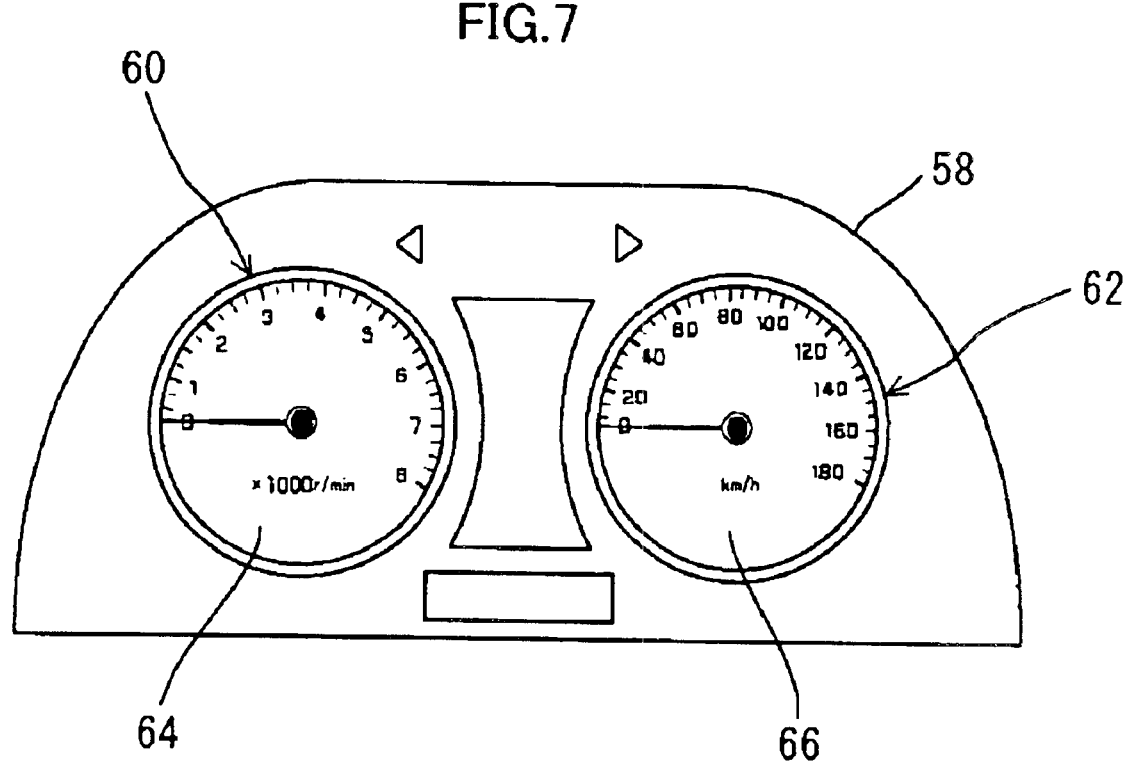
FIG. 7 is a front view showing an automobile instrument panel.

An embodiment of a front cover plate equipped with a function for adjusting luminance of an automobile meter according to the present invention will be described. FIG. 7 is a front view showing an automobile instrument panel. A tachometer 60, a speed meter 62, and the like are placed on an instrument panel 58. These meters 60 and 62 are formed into a circular shape, and a light emitting type letters in an EL (electroluminescence) manner are displayed or numbers and letters utilizing a back light are displayed thereon. Front cover panels 64 and 66 are fitted to the front surfaces of the meters 60 and 62, respectively. Transmittance of the front cover panels 64 and 66 is adjusted by a driver's operation of adjusting luminance, and as a result, the luminance is adjusted.

Figure 8:
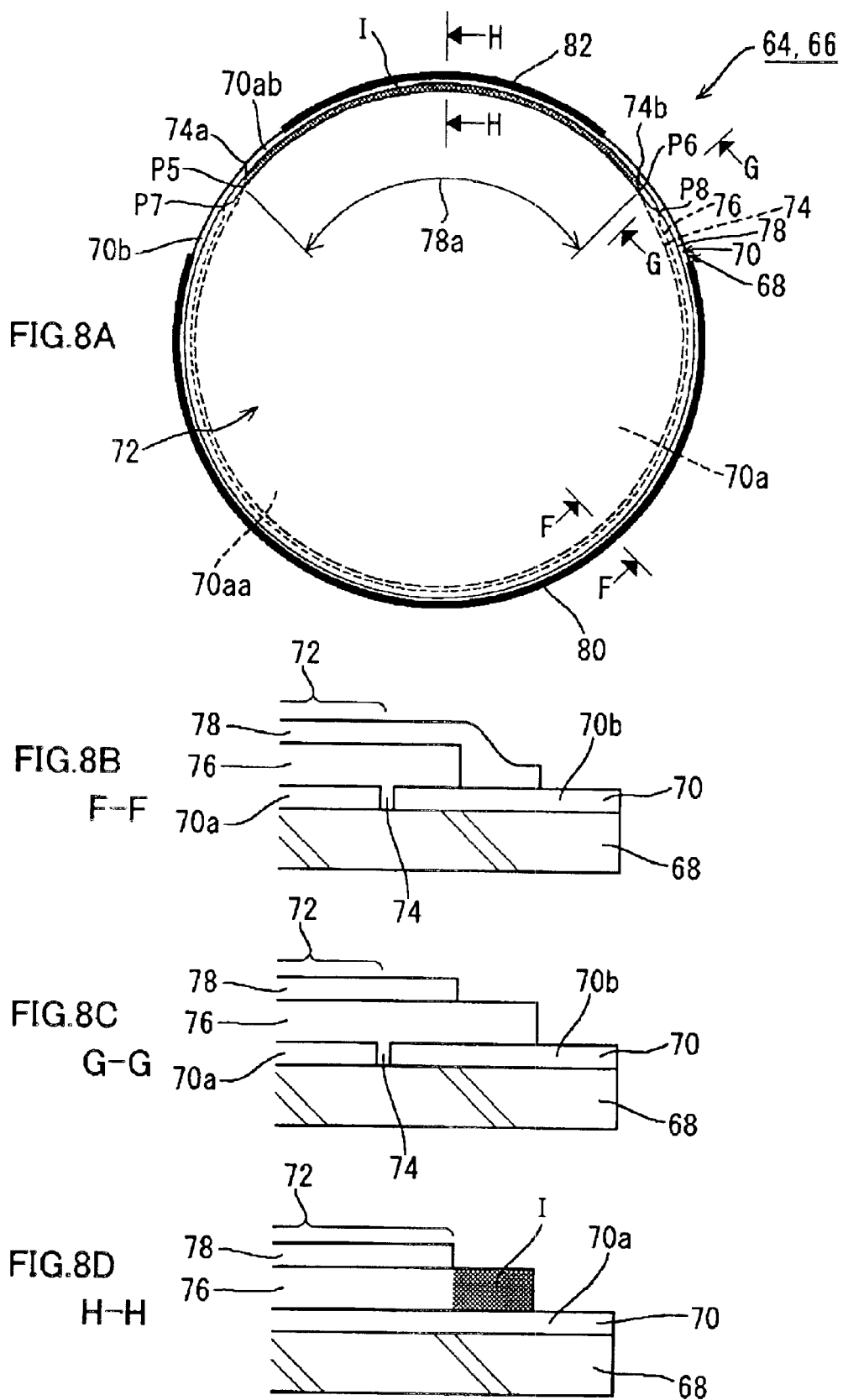
FIG. 8 is a back view and a cross-sectional view showing a configuration of front cover panels attached in front of the meter of FIG. 7.

The configuration of the front cover panels 64 and 66 are shown in FIG. 8. A substrate 68 is composed of a transparent glass substrate having a circular outward appearance, and has a lower electrode layer 70 made of a transparent electrode film such as made of ITO formed on the entire surface of one surface thereof. A parting line 74 is formed on a circular shape along the main portion on the outline of a coloring region 72 having a desirable circular shape so as to inwardly surround the coloring region 72. The parting line 74 is composed of a caved groove in a finely line having a constant width (for example not more than 0.1 mm) by an etching treatment of the surface of the lower electrode layer 70 with laser beam scanning. Both ends 74a and 74b of the parting line 74 are deviated from the outline of coloring region 72 and extend to mutually different positions of the outer edge of the substrate 68. By such a configuration, the lower electrode layer 70 is divided into two outer and inner regions 70a and 70b, which are not conducted to each other, at the parting line as a boundary. The inner region 70a makes up a portion for forming a coloring region including the coloring region 72 and possesses a shape characterizing an outward appearance of the coloring region. The outer region 70b makes up a portion for not forming a coloring region not including the coloring region 72.

An EC layer 76 is formed on the lower electrode layer 70. The EC layer 76 is composed, for example, of an oxidative coloring layer made of a mixture of iridium oxide with tin oxide or such, a solid electrolyte layer made of $Ta_2O_5$ or such, and a reductive coloring layer made of $WO_3$ or such laminated in this order, wherein these layers have the same shape and are laminated in the same position. The layers making up the EC layer 76 are formed so as to cover the whole of the coloring region 72. The outer edge of the EC layer 76 is positioned at the inside of the outer edge of the substrate 68, and is formed into a circular shape along the outer edge of the substrate 68. The whole of the outer edge of the EC layer 76 is formed at the position outside of the coloring region 72.

An upper electrode layer 78 composed of a transparent electrode film such as made of ITO is formed on the EC layer 76. The upper electrode layer 78 is formed so as to cover the whole of the coloring region 72. The whole of the outer edge of the upper electrode layer 78 is positioned at the inside of the outer edge of the substrate 68 and the outer edge of the upper electrode layer 78 is formed into a circular shape along the outer edge of the substrate 68. At a section facing to the portion 70b for not forming a coloring region of the lower electrode layer 70, the outer edge of the upper electrode layer 70 is totally positioned at the outside of the coloring region 72, and outwardly projects from the outer edge of the EC layer 76. By such a configuration, at the portion outwardly projecting from the outer edge of the EC layer 76, the upper electrode layer 78 is conducted to the portion 70b for not forming a coloring region of the lower electrode layer 70. The outer edge of the upper electrode layer 78 at a section facing to the portion 70a for forming a coloring region of the lower electrode layer 70 is totally formed at the inside of the edge of the EC layer 76 along with the outline of the coloring region 72. The outer edge of the upper electrode layer 78 over an appropriate section before and after the positions P5 and P6 crossing to the parting line 74 is formed at the inside of the outer edge of the EC layer 76 (specifically on the EC layer 76). By such a configuration, the upper electrode layer 78 is not conducted to the portion 70a for forming a coloring region of the lower electrode layer 70.

As described above, the whole of the outer edges of the EC layer 76 and the upper electrode layer 78 are formed into a circular shape at inside of the outer edge of the substrate 68 along the outer edge of the substrate 68, and at the position facing to the portion 70b for not forming a coloring region of the lower electrode layer 70, the whole of the outer edges of the EC layer 76 and the upper electrode layer 78 are passed between the outer edge of the substrate 68 and the parting line 74. The outer edge of the upper electrode layer 78 is also positioned at the inside of the outer edge of the EC layer 76 at the position facing to the portion 70a for forming a coloring region of the lower electrode layer 70. Almost of the outer edge of the upper electrode layer 78 is positioned at the outside of the outer edge of the EC layer 76 at the position facing to the portion 70b for not forming a coloring region of the lower electrode layer 70. At the positions P7 and P8 facing to the portion 70b for not forming a coloring region of the lower electrode layer 70, the outer edge of the upper electrode layer 78 is crossing to the outer edge of the EC layer 76 to alter the external and the internal positional relation with the outer edge of the EC layer 76. Also, the outline of the coloring region 72 is delimited by the outline of the region where the portion 70a for forming a coloring region of the lower electrode layer 70, the EC layer 76 and the upper electrode layer 78 are entirely overlapped with each other. Specifically, the parting line 74 makes up a main portion of the outline of the coloring region 72, and the outer edge of the upper electrode layer 78 makes up the remaining portion of the coloring region 72 (section 78a of the outer edge of the upper electrode layer 78). Furthermore, the portion 70a for forming a coloring region of the lower electrode layer 70 is divided into a region 70aa (first region) formed into a circular shape, which follows the outward appearance of the substrate to make up the coloring region 72, and a region 70ab (second region), which is continuous with the first region 70aa to the outer edge of the substrate 68 without making up the coloring region, demarcated by the outer edge position 78a of the upper electrode layer 78. The width of the boundary portion between these regions 70aa and 70ab (length of the section 78a of the outer edge of the upper electrode layer 78) is composed to be shorter than the maximum width of the coloring region 72 (maximum external size of the coloring region 72).

Clip electrodes 80 and 82 are attached to upper and lower sides of the substrate 68 opposite each other. The clip electrode 80 is conducted to the upper electrode layer 78 via the portion 70b for not forming a coloring region of the lower electrode layer 70. The clip electrode 82 is conducted to the portion 70a for forming a coloring region of the lower electrode layer 70. A sealing glass (not shown) is adhered onto the substrate 68 with an adhesive to seal the laminated films. This totally makes up the front cover panels 64 and 66 transparent. Upon applying a voltage in a coloring direction between the clip electrodes 80 and 82, the coloring region 72 of the EC layer 76 is colored. Subsequently, upon applying a voltage in a reverse direction (voltage in a discoloring direction) between the clip electrodes 80 and 82, the coloring region 72 of the EC layer 76 or upon shortening between the clip electrodes 80 and 82, the EC layer 76 is discolored. The portion where the blurred color occurs at the time of the discoloration is around the portion 78a composed of the outer edge of the upper electrode layer 78 amongst the outline of the coloring region 72 (portion I shown by hatching line in FIG. 8). Since the length of this portion in this embodiment is short, the section where blurred color occurs can be shortened. Also, since the parting line 74 makes up the major portion of the total length of the outline of the coloring region 72 (length not less than half), the main portion of the outline of the coloring region 72 can be made up of the parting line 74 to characterize the outward appearance of the coloring region 72.

Third Embodiment

Figure 9:
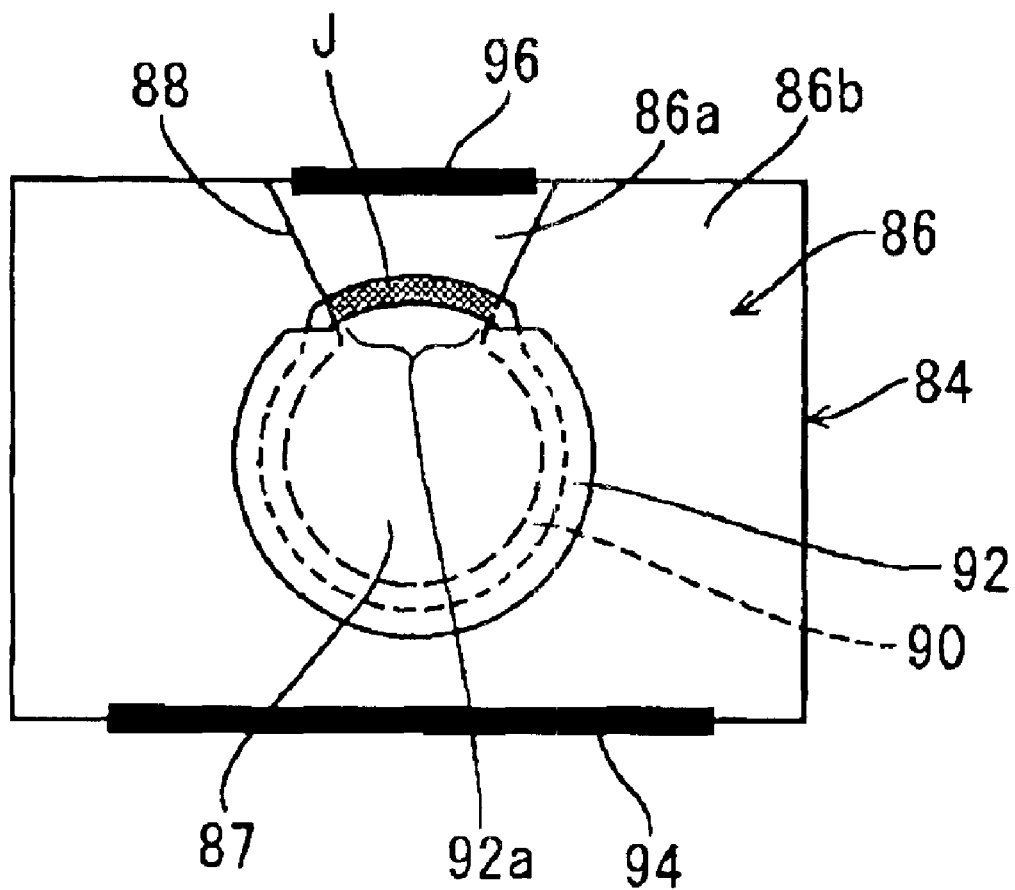
FIG. 9 is a front view showing an embodiment of an exposure-regulator placed on an optical axis of an image pickup device of a digital camera according to the present invention.

An embodiment of a filter for a digital camera (including a still camera, a video camera, etc.) according to the present invention is shown in FIG. 9. A lower electrode layer 86 composed of a transparent electrode film made, e.g., of ITO is formed on an entire surface of one surface of a rectangular, transparent glass substrate 84 having a size of approximately 10 mm×5 mm. A parting line 88 is formed on a circular shape along the main portion on the outline of a coloring region 87 having a desirable circular shape (for example, 5 mm in diameter) so as to inwardly surround the coloring region 87 by an etching treatment with laser beam scanning. By such a configuration, the lower electrode layer 86 is divided into a portion 86a for forming a coloring region and a portion 86b for not forming a coloring region. On the lower electrode layer 86, an EC layer 90 and an upper electrode layer 92 are formed in this order so as to totally surround the coloring region 87. The positional relationship among the portion 86a for forming a coloring region and the portion 86b for not forming a coloring region of the lower electrode layer 86, EC layer 90, and the upper electrode layer 92 are the same as that described previously in Second Embodiment. Clip electrodes 94 and 96 are attached to opposite sides of a transparent glass substrate 84. The clip electrode 94 is conducted to the upper electrode layer 92 via the portion 86b for not forming a coloring region of the lower electrode layer 86. The clip electrode 96 is conducted to the portion 86a for forming a coloring region of the lower electrode layer 86. A sealing glass (not shown) is adhered onto the substrate 84 with an adhesive to seal the laminated film to constitute the filter in transparent as a whole. The filter is placed on an optical axis of an image pickup device such as CCD of a digital camera, the coloring region 87 is discolored when the luminance of a subject detected by a photometric element separately provided is within a predetermined value, and the coloring region 87 is colored when the luminance is higher than the predetermined value. The portion where the blurred color occurs at the time of the discoloration is around the portion 92a composed of the outer edge of the upper electrode layer 92 amongst the outline of the coloring region 87 (portion J shown by hatching line in FIG. 9). Since the length of this portion in this embodiment is short, the section where blurred color occurs can be shortened. Also, since the parting line 88 makes up the major portion of the total length of the outline of the coloring region 87 (length not less than half), the main portion of the outline of the coloring region 87 can be made up of the parting line 88 to characterize the outward appearance of the coloring region 87.

It is noted that such a small sized EC element can also be produced by preparing one large sized transparent glass substrate (for example a square substrate with 300 mm size) with a transparent electrode film, forming continuous one parting line or a plurality of parting lines to follow the positions corresponding to a plurality of the coloring regions of the EC elements with a laser etching treatment, forming EC layers in respective EC elements utilizing one large sized mask, which covers the whole of the substrate, forming an upper electrode layer at the position of respective EC elements utilizing another one large sized mask, which covers the whole of the substrate, and cutting the resulting laminated film into respective EC elements. According to the process as just mentioned, a plurality of EC elements can be produced at once, making it possible to mass production.

Fourth Embodiment

Figure 10:
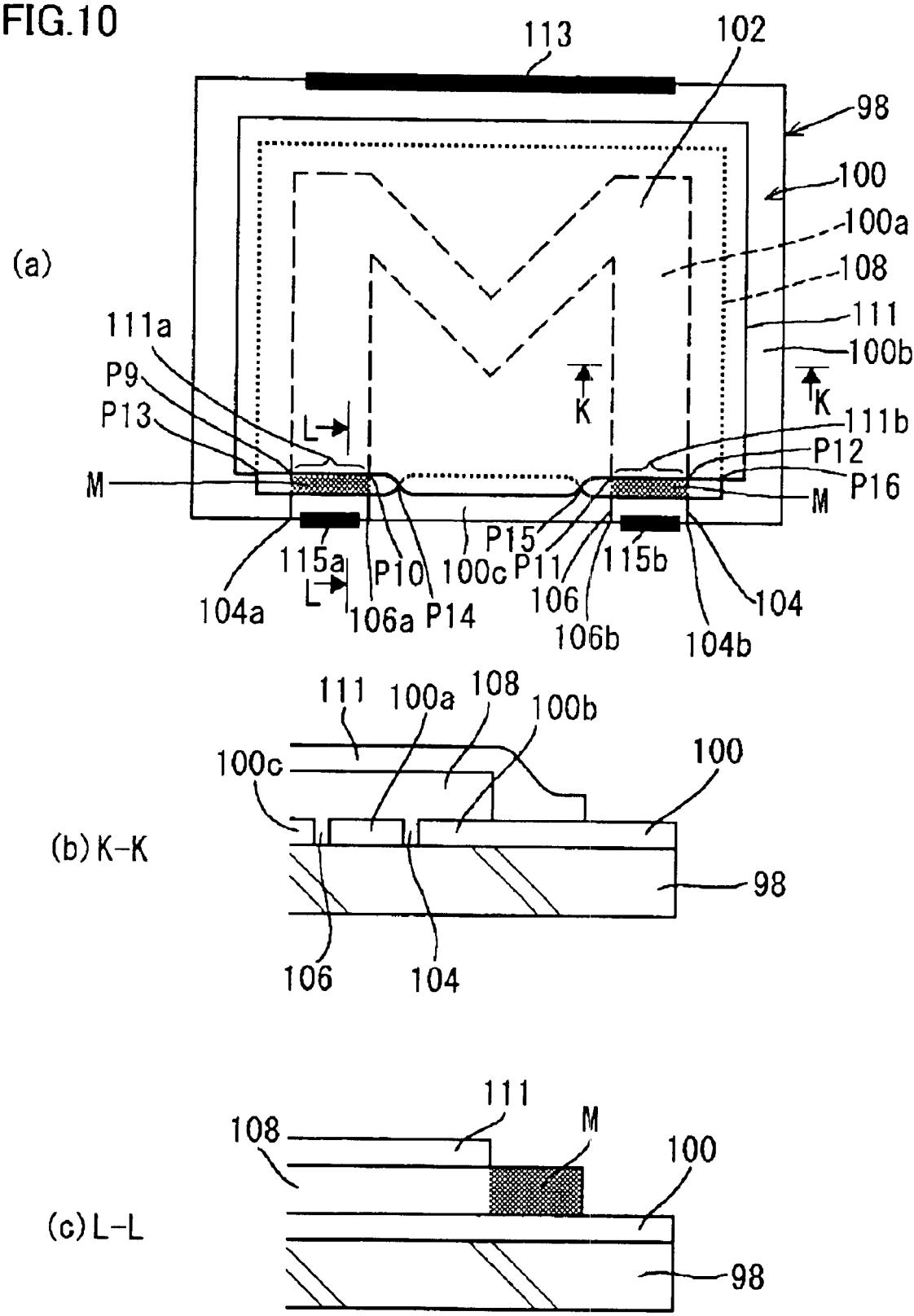
FIG. 10 is a back view and a cross-sectional view showing an embodiment of a display element according to the present invention.

A display element according to an embodiment of the present invention is shown in FIG. 10. A substrate 98 is composed of a rectangular, transparent glass substrate, and has a lower electrode layer 100 formed on the entire surface of one surface thereof. Parting lines 104 and 106 are formed on the lower electrode layer 100 along the main portion on the outline of a desirable coloring region 102 so as to inwardly surround the coloring region 102. The parting lines 104 and 106 are each composed of a caved groove in a finely line having a constant width (for example not more than 0.1 mm) by an etching treatment of the surface of the lower electrode layer 100 with laser beam scanning. Both ends 104a and 104b of the parting line 104 and both ends 106a and 106b of the parting line 106 are deviated from the outline of coloring region 102 and extend to mutually different positions of the outer edge of the substrate 98. By such a configuration, the lower electrode layer 100 is divided into three regions 100a, 100b, and 100c, which are not conducted to each other, at the parting lines 104 and 106 as boundaries. The region 100a makes up a portion for forming a coloring region including the coloring region 102 and possesses a shape characterizing an outward appearance of the coloring region (shape "M" in alphabet in the embodiment of FIG. 10). The regions 100b and 10c make up portions for not forming a coloring region not including the coloring region 102.

An EC layer 108 is formed on the lower electrode layer 100. The EC layer 108 is composed, for example, of an oxidative coloring layer made of a mixture of iridium oxide with tin oxide or such, a solid electrolyte layer made of $Ta_2O_5$ or such, and a reductive coloring layer made of $WO_3$ or such laminated in this order, wherein these layers have the same shape and are laminated in the same position. The layers making up the EC layer 108 are formed so as to cover the whole of the coloring region 102. The outer edge of the EC layer 108 is positioned at the inside of the outer edge of the substrate 98, and is formed into a rectangular shape along the outer edge of the substrate 98. The whole of the outer edge of the EC layer 108 is formed at the outside of the coloring region 102.

An upper electrode layer 111 composed of a transparent electrode film such as made of ITO is formed on the EC layer 108. The upper electrode layer 111 is formed so as to cover the whole of the coloring region 102. The whole of the outer edge of the upper electrode layer 111 is positioned at the inside of the outer edge of the substrate 98 and the outer edge of the upper electrode layer 111 is formed into a rectangular shape along the outer edge of the substrate 98. At a section facing to the portion 100b for not forming a coloring region of the lower electrode layer 100, the outer edge of the upper electrode layer 111 is totally positioned at the outside of the coloring region 102, and outwardly projects from the outer edge of the EC layer 108. By such a configuration, at the portion outwardly projecting from the outer edge of the EC layer 108, the upper electrode layer 111 is conducted to the portion 100b for not forming a coloring region of the lower electrode layer 100. The outer edge of the upper electrode layer 111 at sections 111a and 111b facing to the portion 100a for forming a coloring region of the lower electrode layer 100 is totally formed at the inside of the edge of the EC layer 108 along with the outline of the coloring region 102. The outer edge of the upper electrode layer 111 over an appropriate section before and after the positions P9, P10, P11 and P12 crossing to the parting line 104 is formed at the inside of the outer edge of the EC layer 108 (specifically on the EC layer 108). By such a configuration, the upper electrode layer 111 is not conducted to the portion 100a for forming a coloring region of the lower electrode layer 100.

As described above, the whole of the outer edges of the EC layer 108 and the upper electrode layer 111 are formed into a rectangular shape at inside of the outer edge of the substrate 98 along the outer edge of the substrate 98, and at the position facing to the portion 100b for not forming a coloring region of the lower electrode layer 100, they are passed between the outer edge of the substrate 98 and the parting line 104. The outer edge of the upper electrode layer 111 is also positioned at the inside of the outer edge of the EC layer 108 at the position facing to the portion 100a for forming a coloring region of the lower electrode layer 100. At the position facing to the portion 100b for not forming a coloring region, almost all of the outer edge of the upper electrode layer 111 is positioned at the outside of the edge of the EC layer 108. At the positions P13, P14, P15 and P16 facing to the portions 100b and 100c for not forming a coloring region, the outer edge of the upper electrode layer 111 is crossing to the outer edge of the EC layer 108 to alter the external and the internal positional relation with the outer edge of the EC layer 108. Also, the outline of the coloring region 102 is delimited by the outline of the region where the portion 100a for forming a coloring region of the lower electrode layer 100, EC layer 108 and the upper electrode layer 111 are entirely overlapped with each other. Specifically, the parting lines 104 and 106 make up a main portion of the outline of the coloring region 102, and the outer edge of the upper electrode layer 111 makes up the remaining portions of the coloring region 102 (sections 111a and 111b of the outer edge of the upper electrode layer 111).

Clip electrodes 113, 115a and 115b (one of the clip electrodes 115a and 115b may be omitted) are attached to mutually opposite sides of the substrate 98. The clip electrode 113 is conducted to the upper electrode layer 111 via the portion 100b for not forming a coloring region of the lower electrode layer 100. The clip electrode 115 (115a and 115b) is conducted to the portion 100a for forming a coloring region of the lower electrode layer 100. A region 100c of the lower electrode layer 100 is conducted to the upper electrode layer 111. A sealing glass (not shown) is adhered onto the substrate 68 with an adhesive to seal the laminated films, constituting the display element in transparent as a whole. Upon applying a voltage in a coloring direction between the clip electrodes 113 and 115, the coloring region 102 of the EC layer 108 is colored to display the alphabet "M". Subsequently, upon applying a voltage in a reverse direction (voltage in a discoloring direction) between the clip electrodes 113 and 115, or upon shortening between the clip electrodes 113 and 115, the EC layer 108 is discolored. The portions where the blurred color occurs at the time of the discoloration are around the portions 111a and 111b composed of the outer edge of the upper electrode layer 111 amongst the outline of the coloring region 102 (portion M shown by hatching line in FIG. 10). Since the length of this portion in this embodiment is short, the section where blurred color occurs can be shortened. Also, since the parting lines 104 and 106 makes up the major portion of the total length of the outline of the coloring region 102 (length not less than half), the main portion of the outline of the coloring region 102 can be made up of these parting line 104 and 106 to characterize the outward appearance of the coloring region 102. invention.

What is claimed is:

1. A solid type EC element having a substrate, a lower electrode layer formed on said substrate, an EC layer formed on said lower electrode layer, and an upper electrode layer formed on said EC layer, said lower electrode layer being divided by one or more parting lines non-linearly formed along the outline of a desired coloring region so as to surround said desired coloring region into a portion for forming a coloring region including said desired coloring region and a portion for not forming a coloring region not including said desired coloring region in the state said portion for forming a coloring region and said portion for not forming a coloring region are not conducted to each other;

layers, which make up said EC layer, and said upper electrode layer being formed so as to entirely cover said coloring area; and said upper electrode layer being not conducted to said portion for forming a coloring region of said lower electrode layer, and said upper electrode layer being conducted to said portion for not forming a coloring region of said lower electrode layer.

2. The solid type EC element according to claim 1, wherein said parting line or parting lines makes or make up a main portion of the outline of said desired coloring region, and the outer edge of said upper electrode layer makes up the remaining portion of the outline of said desired coloring region.

3. The solid type EC element according to claim 1, wherein said portion for forming a coloring region possesses a shape characterizing the outward appearance of said desired coloring region.

4. The solid type EC element according to claim 1, wherein said portion for forming a coloring region of said lower electrode layer has a first region making up the desired coloring region and a second region, which is continuous with said first, and which extends to the outer edge of said lower electrode layer without making up the desired coloring region, demarcated by the outer edge position of the upper electrode layer, and
wherein said EC layer is formed in the state where said EC layer covers a portion from the whole of said first region of the portion for forming a coloring region of said lower electrode layer to a part of the second region thereof, and the upper electrode layer covers the whole of the first region of the portion for forming a coloring region of said lower electrode layer and does not covers the second region thereof.

5. The solid type EC element according to claim 1, wherein said substrate is composed of a transparent substrate, said lower electrode layer is composed of a transparent electrode film, said upper electrode layer is composed of a metal-made reflecting film, said substrate is adhered to a plate material other than the substrate with an adhesive, and said lower electrode layer, said EC layer, and said upper electrode layer are intervened between the substrate and the plate other than the substrate to make up an EC mirror.

6. The solid type EC element according to claim 1, wherein a plate other than the substrate is adhered to said substrate with an adhesive, said lower electrode layer, said EC layer, and said upper electrode layer are intervened between said substrate and the plate other than the substrate, wherein said substrate is composed of a transparent substrate, both of said lower electrode layer and said upper electrode layer are composed of transparent electrodes films, said adhesive is composed of a transparent adhesive, and said plate other than the substrate is composed of a transparent plate to make up a transmitting EC element.

7. The solid type EC element according to claim 1, wherein said substrate is composed of a transparent substrate, said lower electrode layer is composed of a transparent electrode film, said upper electrode layer is composed of a transparent electrode film or a metal-made reflecting film, and said desired coloring region is formed into a desired shape selected from among letters, symbols and figures to make up a display element.

8. The solid type EC element according to claim 1, wherein said parting line makes up half or more the total length of the outline of said desired coloring region.

9. The solid type EC element according to claim 1, wherein said portion for forming a coloring region of the lower electrode layer has a portion narrower than the maximum width of the desired coloring region, and a portion which is made up of the outer edge of said upper electrode layer amongst the outline of the desired coloring region is formed on said portion for forming a coloring region where the width is narrower.

10. The solid type EC element according to claim 1, wherein a length of a portion constituted by the outer edge of said upper electrode layer amongst the outline of the desired coloring region is composed so as to be shorter than the maximum outer size of the desired coloring region.

11. The solid type EC element according to claim 1, wherein said parting line is formed inside of the outer edge of said substrate along the length longer than the total length of the outer edge of said substrate.

12. A solid type EC element having
a substrate;
a lower electrode layer formed on said substrate;
an EC layer formed on said lower electrode layer; and
an upper electrode layer formed on said EC layer;
said lower electrode layer being divided by one or more parting lines, which are non-linearly formed along the outline of a desired coloring region so as to surround said desired coloring region, and being formed so that both ends of the lines are deviated from the outline of said desired coloring region and extend to mutually different positions on the outer edge of said lower electrode layer, into a portion for forming a coloring region including said desired coloring region and a portion for not forming a coloring region not including said desired coloring region in the state said portion for forming a coloring region and said portion for not forming a coloring region are not conducted to each other; wherein layers, which make up said EC layer, and said upper electrode layer are formed so as to entirely cover said coloring area;
the outer edge of said EC layer being entirely formed outside of said desired coloring region; wherein the outer edge of said upper electrode layer at a section which faces to said portion for not forming a coloring region of said lower electrode layer is totally formed outside of said desired coloring region, and at least part thereof outwardly projecting from said outer edge of the EC layer, and said upper electrode layer being conducted to said portion for not forming a coloring region of said lower electrode layer at the portion outwardly projecting from said outer edge of the EC layer;
the outer edge of said upper electrode layer at a section which faces to said portion for forming a coloring region of said lower electrode layer being totally formed at a portion inside of the edge of said EC layer along with the outline of said desired coloring region;
the outer edge of said upper electrode layer over an appropriate section before and after the position crossing to said parting lines being formed at a portion inside of the outer edge of said EC layer, whereby said upper electrode layer is not conducted to said portion for forming a coloring region of said lower electrode layer; and
the outline of said desired coloring region being delimited by the outline of a region where all of said portion for forming a coloring region of said lower electrode layer, said layers which make up said EC layer, and said upper electrode layer are overlapped with each other.

13. The solid type EC element according to claim 12, wherein said parting line or parting lines makes or make up a main portion of the outline of said desired coloring region, and the outer edge of said upper electrode layer makes up the remaining portion of the outline of said desired coloring region.

14. The solid type EC element according to claim 12, wherein said portion for forming a coloring region possesses a shape characterizing the outward appearance of said desired coloring region.

15. The solid type EC element according to claim 12, wherein said portion for forming a coloring region of said lower electrode layer has a first region making up the desired coloring region and a second region, which is continuous with said first, and which extends to the outer edge of said lower electrode layer without making up the desired coloring region, demarcated by the outer edge position of the upper electrode layer, and
    wherein said EC layer is formed in the state where said EC layer covers a portion from the whole of said first region of the portion for forming a coloring region of said lower electrode layer to a part of the second region thereof, and the upper electrode layer covers the whole of the first region of the portion for forming a coloring region of said lower electrode layer and does not covers the second region thereof.

16. The solid type EC element according to claim 12, wherein said substrate is composed of a transparent substrate, said lower electrode layer is composed of a transparent electrode film, said upper electrode layer is composed of a metal-made reflecting film, said substrate is adhered to a plate material other than the substrate with an adhesive, and said lower electrode layer, said EC layer, and said upper electrode layer are intervened between the substrate and the plate other than the substrate to make up an EC mirror.

17. The solid type EC element according to claim 12, wherein a plate other than the substrate is adhered to said substrate with an adhesive, said lower electrode layer, said EC layer, and said upper electrode layer are intervened between said substrate and the plate other than the substrate, wherein said substrate is composed of a transparent substrate, both of said lower electrode layer and said upper electrode layer are composed of transparent electrodes films, said adhesive is composed of a transparent adhesive, and said plate other than the substrate is composed of a transparent plate to make up a transmitting EC element.

18. The solid type EC element according to claim 12, wherein said substrate is composed of a transparent substrate, said lower electrode layer is composed of a transparent electrode film, said upper electrode layer is composed of a transparent electrode film or a metal-made reflecting film, and said desired coloring region is formed into a desired shape selected from among letters, symbols and figures to make up a display element.

19. The solid type EC element according to claim 12, wherein said parting line makes up half or more the total length of the outline of said desired coloring region.

20. The solid type EC element according to claim 12, wherein said portion for forming a coloring region of the lower electrode layer has a portion narrower than the maximum width of the desired coloring region, and a portion which is made up of the outer edge of said upper electrode layer amongst the outline of the desired coloring region is formed on said portion for forming a coloring region where the width is narrower.

21. The solid type EC element according to claim 12, wherein a length of a portion constituted by the outer edge of said upper electrode layer amongst the outline of the desired coloring region is composed so as to be shorter than the maximum outer size of the desired coloring region.

22. The solid type EC element according to claim 12, wherein said parting line is formed inside of the outer edge of said substrate along the length longer than the total length of the outer edge of said substrate.

23. A process for producing a solid type EC element comprising:
    a film formation stage where a lower electrode layer are formed on a substrate;
    a stage where an etching treatment with a laser beam scanning is subjected to a surface of said lower electrode layer to form a parting line so as to surround a desired coloring region along the outline of the desired coloring region, whereby the lower electrode layer is divided into a portion forming a coloring region including the desired coloring region and a portion for not forming a coloring region not including the desired coloring region in such a manner that they are not conducted to each other;
    a stage where layers for making up an EC layer are formed on the lower electrode layer in such a manner that they covers the entire surface of the desired coloring region; and
    a stage where an upper electrode layer is formed on the EC layer in such a manner that said upper electrode layer covers the whole of the desired coloring region, and is not conducted to the portion for forming a coloring region of the lower electrode layer and is conducted to the portion for not forming a coloring region of the lower electrode layer.

24. The process for producing a solid type EC element according to claim 23, wherein a plurality of EC elements are formed on one substrate in each stage, and said substrate is cut into each EC element after the completion of each stage.

25. A process for producing a solid type EC element comprising:
    a film formation stage where a lower electrode layer are formed on a substrate;
    a stage where an etching treatment with a laser beam scanning is subjected to a surface of the lower electrode layer to form a parting line so as to surround a desired coloring region along the outline of the desired coloring region, in a non-linear manner and so that both ends are deviated from the outline of the desired coloring region and extend to the outer edge of the lower electrode layer at mutually different positions, whereby the lower electrode layer is divided by said parting line into a portion forming a coloring region including the desired coloring region and a portion for not forming a coloring region not including the desired coloring region in such a manner they are not conducted to each other;
    a stage where a coloring layer and a solid electrolyte layer are formed on the lower electrode layer having said parting line formed thereon using a common mask in such a manner that they covers the entire surface of the desired coloring region; and
    a stage where an upper electrode layer is formed on said EC layer utilizing a mask in such a manner that said upper electrode layer totally covers said desired coloring region; that the outer edge of said upper electrode layer at a section which faces to said portion for not forming a coloring region of said lower electrode layer is totally formed outside of said desired coloring region, and a part of said outer edge of said upper electrode layer projecting outside of said outer edge of the EC layer, and said upper electrode layer is conducted to said portion for not forming a coloring region of said lower electrode layer at the portion projecting outside of said outer edge of the EC layer; and that the outer edge of said upper electrode layer at a section which faces to said portion for forming a coloring region of said lower electrode layer is totally formed inside of the edge of said EC layer along with the outline of said desired coloring region, whereby said upper electrode layer is not conducted to said portion for forming a coloring region of said lower electrode layer.

26. The process for producing a solid type EC element according to claim 25, wherein a plurality of EC elements are formed on one substrate in each stage, and said substrate is cut into each EC element after the completion of each stage.

* * * * *